R. H. McNEE.
LUBRICATING DEVICE.
APPLICATION FILED JUNE 8, 1916.
1,223,993. Patented Apr. 24, 1917.
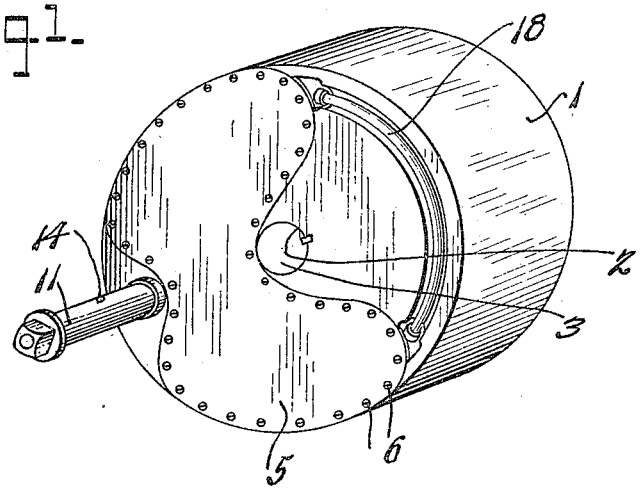
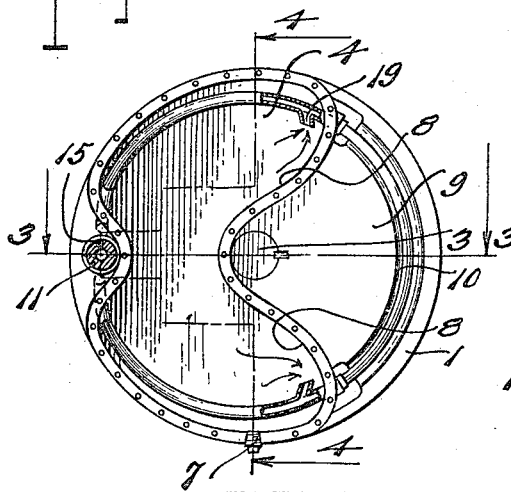
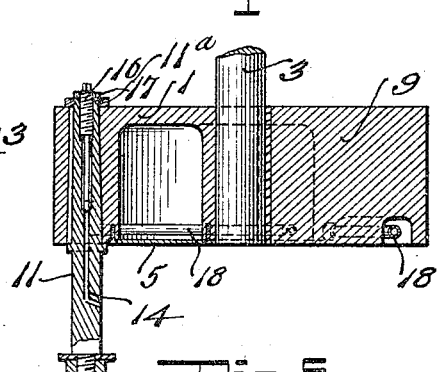
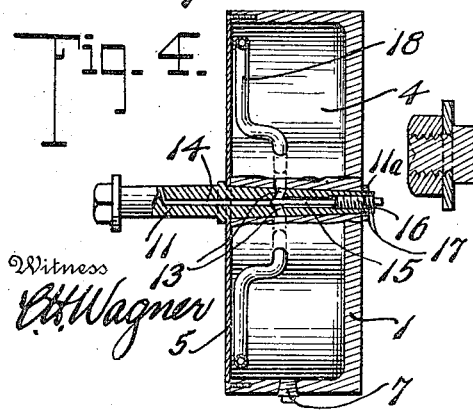
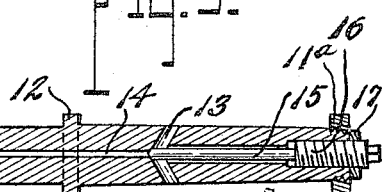
Inventor
R. H. McNee
By Robb & Robb
Attorneys
Witness
C. H. Wagner

UNITED STATES PATENT OFFICE.

ROBERT H. McNEE, OF NYSSA, OREGON.

LUBRICATING DEVICE.

1,223,993.       Specification of Letters Patent.       Patented Apr. 24, 1917.

Application filed June 8, 1916. Serial No. 102,530.

*To all whom it may concern:*

Be it known that I, ROBERT H. MCNEE, a citizen of the United States, residing at Nyssa, in the county of Malheur and State of Oregon, have invented certain new and useful Improvements in Lubricating Devices, of which the following is a specification.

This invention has to do with lubricating devices, having for its primary object to provide for the proper lubrication of a spindle or equivalent element carried by a rotatable member, by the centrifugal action upon a lubricant supply carried by said rotatable member.

In carrying out the invention it is contemplated to adapt the system to the pitman or balance wheel of a mower, reaper, or similar machine, which element is formed with a chamber for holding a quantity of lubricant and provided with ducts or passages leading therefrom to the crank pin whereby during operation of the apparatus a constant supply of lubricant is maintained for the pitman rod connection.

It is further contemplated to provide means for controlling the quantity of lubricant supply to the spindle member hereinbefore mentioned.

These and such other objects as may hereinafter appear are attained by the novel construction, combination and arrangement of parts to be hereinafter specifically described and claimed. Reference will now be had to the accompanying drawing, forming a part of this specification, wherein:

Figure 1 is a perspective view of a device constructed in accordance with my invention.

Fig. 2 is a front elevation with the lubricant chamber cover removed and the spindle shown in section.

Fig. 3 is a horizontal sectional view on the line 3—3 of Fig. 2.

Fig. 4 is a vertical sectional view on the line 4—4 of Fig. 2; and

Fig. 5 is a longitudinal sectional view of the spindle member alone.

Throughout the following detail description, and on the several figures of the drawing, similar parts are referred to by like reference characters.

Referring to the drawing, the numeral 1 designates a revoluble member which in the adaptation of this device constitutes the balance or pitman wheel for a mower, said member being provided with a central opening 2 to receive the crank shaft 3 of said mower. At one side the revoluble member is provided with a chamber 4 which is designed to hold a supply of lubricant, said chamber being provided with a removable cover 5, secured in place by suitable fastening means 6. The chamber 4 is filled with lubricant by removal of a plug 7 closing an opening through the peripheral wall of the member 1. It will be observed by reference to Fig. 2 that the chamber 4 is of a peculiar shape somewhat like the figure 8. In other words, at each end the chamber is enlarged by forming the chamber with a recurved wall 8 at each side of the central opening 2, said walls extending substantially radially to the periphery of the body member 1. That portion of the body designated 9 is preferably solid so as to counterbalance the weight of lubricant held by the chamber 4, and this solid portion is provided with an annular groove 10.

The member 1 is provided at one side with a transverse opening, as usual, to receive the key seated spindle 11, shown most clearly in Fig. 5. The spindle is provided with an annular shoulder 12 forming a stop, one end of the said spindle being tapered to correspond with the tapered opening in which it is seated and threaded to receive the nut 11ª. The spindle furthermore is provided with a transverse passage 13 and a longitudinal passage 14 which leads from the inner end of the spindle to the central portion of the opposite end on which the pitman rod is journaled. The passage 14 is enlarged at its inner end portion to the point of intersection of the transverse passage 13 so as to receive the needle valve 15 having the enlarged threaded end 16 for adjusting its position, said valve or pin being provided with a lock nut 17 to hold it at such adjusted position. It may be here mentioned that the lubricant, as will be more particularly apparent from the following description, passes through the transverse passage 13 and the feed thereof through the longitudinal passage 14 is controlled by the adjustment of the valve 15.

In the body 1 is arranged an oil duct or passage 18 which extends circumferentially of the body through the oil chamber 4 and the groove 10 so as to communicate at each end with the extremities of the transverse passage 13 in the spindle 11. This duct 18 is provided with entrance passages 19 arranged at substantially diametrically opposite points of the revoluble member 1, each of these passages extending angularly toward and adjacent to the recurved walls 8 hereinbefore referred to.

In the operation of this device, rotation of the revoluble member 1 by the crank shaft 3 counter-clockwise will cause the lubricant in the chamber 4, by reason of centrifugal action, to be thrown toward its periphery following the line of the upper recurved wall 8 and into the upper entrance passage 19, said lubricant moving through the duct 18 in a clockwise direction to the spindle or crank pin 11 where it passes into the longitudinal passage 14 and adequately maintains a supply of lubricant for the pitman rod carried thereby. In its essential features this is sufficient for the purposes of this lubricating system but inasmuch as the member might be revolved in an opposite direction it is found desirable to extend the passage 18 entirely around the revoluble member as hereinbefore described so that if the member 1 is rotated in the direction opposite that above referred to, the lubricant will pass into the other entrance passage 19 and circulate in the opposite direction to the spindle.

It is to be observed particularly, in this double circulation arrangement that when the oil from the chamber 4 passes into the upper passage 19 in moving clockwise through the duct 18, the angularity of the lower passage 19 will tend to prevent this oil from leaving the duct at that point instead of passing on through the latter to the spindle. The same action is true when the circulation is reversed and the oil enters the lower passage 19, with respect to the corresponding upper passage.

As hereinbefore premised the lubricating principle set forth in this application is not limited in application to mowers, reapers or agricultural implements. As a matter of fact it is within the purview of the invention that it may be adapted to the drive wheels of locomotives or wherever there is an element associated with a revoluble member to which lubricant is designed to be fed through the action of centrifugal force.

Having thus described my invention, what I claim as new is:

1. The combination with a revoluble member and actuating means therefor, of an element arranged in spaced relation to the actuating means aforesaid and constituting the operative connection between the revoluble member and a part to be operated thereby, a lubricant reservoir embodied in said revoluble member, and a passage leading from the lubricant reservoir to said connection element to supply lubricant thereto incident to centrifugal action during rotation of the revoluble member.

2. A lubricating device comprising a revoluble member, a spindle element carried thereby, a chamber formed in said revoluble member having a recurved end wall extending substantially radially of the revoluble member, and a duct having its entrance arranged adjacent to the end wall to receive the lubricant directed thereinto by said wall under centrifugal action when the revoluble member is rotated, said duct leading to the spindle aforesaid.

3. A lubricating device comprising a revoluble member having an opening to receive a member to be lubricated, a chamber in said revoluble member for holding a supply of lubricant, and a duct arranged circumferentially of the revoluble member and communicating at each end with the opening aforesaid, said duct having an entrance thereinto from the lubricant chamber whereby to provide a circulation of lubricant through the opening during rotation of the revoluble member.

4. A lubricating device of the class described comprising a revoluble member, a spindle element carried thereby and having a lubricant passage therethrough, a chamber in said revoluble member for holding a supply of lubricant, an annular groove formed in the revoluble member, and a duct seated in said groove and communicating at its ends with the lubricant passage in the spindle aforesaid, said duct having an entrance thereinto arranged in the lubricant chamber whereby to provide a circulation of lubricant through the duct during rotation of the revoluble member.

5. A lubricating device comprising a revoluble member, a spindle element carried thereby and having a lubricant passage therethrough, a chamber in said revoluble member for holding a supply of lubricant, and a duct extending circumferentially about the revoluble member and communicating at each end with the lubricant passage in the spindle aforesaid, said duct having spaced entrances thereinto at substantially diametrically opposite points of the revoluble member whereby to permit a flow of lubricant under centrifugal action in either direction of rotation of the revoluble member through said duct.

6. A lubricating device comprising a revoluble member, a spindle element carried thereby and having a lubricant passage therethrough, a chamber in said revoluble member for holding a supply of lubricant, and a duct extending circumferentially about the revoluble member and communicating at each end with the lubricant passage in the spindle aforesaid, said duct having entrance passages located in the chamber at diametrically opposite points of the revoluble member and arranged angularly with respect to the duct whereby to permit entrance of the lubricant through one of the passages during movement of the revoluble member in one direction while preventing passage of the lubricant back to the chamber through the other passage during such movement.

7. In a lubricating device of the class described, the combination of a revoluble member having an opening therein, a spindle member seated in said opening and having a longitudinal lubricant passage therein, valve means carried by said spindle for controlling the feed of lubricant through said passage, and a chamber in said revoluble member for holding a supply of lubricant and communicating with the lubricant passage in the spindle aforesaid whereby to feed the lubricant to said spindle.

8. In a lubricating device of the class described, the combination of a revoluble member having an opening therethrough, a spindle element arranged in said opening and having a longitudinal lubricant passage, and a transverse intersecting feed passage therethrough, means adjustable in one of said passages for controlling feed of lubricant to the other of said passages, a chamber in said revoluble member for holding a supply of lubricant, and a duct arranged circumferentially of the revoluble member and communicating with the transverse spindle passage aforesaid, said duct having entrance passages thereinto for receiving lubricant from the chamber.

9. A lubricating device of the class described comprising a revoluble member, a lubricant chamber therein having enlarged end portions formed by recurving the wall at said end portions in a line substantially radially of the revoluble member, an element connected to said revoluble member and adapted to be lubricated, a duct arranged annularly of the revoluble member and leading from the lubricant chamber to said element, an entrance passage for said duct arranged at each end portion of the lubricant chamber and adjacent to the recurved wall at said end portion, and a removable cover for said chamber.

In testimony whereof I affix my signature.

ROBERT H. McNEE.

Witnesses:
E. J. BURROUGH,
GEO. E. WARD.

Copies of this patent may be obtained for five cents each, by addressing the "Commissioner of Patents, Washington, D. C."